United States Patent
Gilbert

[15] 3,686,379
[45] Aug. 22, 1972

[54] SEALING PARISONS USING PREBLOW AND CONTOURED SEALING SURFACE

[72] Inventor: Dixie E. Gilbert, Bartlesville, Okla.

[73] Assignee: Phillips Petroleum Company

[22] Filed: Aug. 18, 1969

[21] Appl. No.: 850,804

[52] U.S. Cl. .................... 264/89, 18/5 BM, 18/5 BS, 264/99, 264/161
[51] Int. Cl. ................... B29c 17/07, B29c 17/08
[58] Field of Search............. 264/94, 98, 99, 89, 161; 18/5 BM, 5 BB, 5 BE, 5 BS

[56] References Cited

UNITED STATES PATENTS 3,288,317 11/1966 Wiley.........................18/14 A
3,311,684 3/1967 Heider........................264/99
3,390,426 7/1968 Turner et al.............264/98 X
3,592,885 7/1971 Goins et al...............264/94 X

FOREIGN PATENTS OR APPLICATIONS 764,321 8/1967 Canada......................264/94

Primary Examiner—Robert F. White
Assistant Examiner—J. H. Silbaugh
Attorney—Young & Quigg

[57] ABSTRACT

An open end parison preform is stretched longitudinally, expanded slightly with preblow fluid, and pinched shut with a contoured sealing member to form a bead along the sealing seam.

6 Claims, 5 Drawing Figures

PATENTED AUG 22 1972  3,686,379

INVENTOR.
D. E. GILBERT

BY
*Young + Quigg*

ATTORNEYS

SEALING PARISONS USING PREBLOW AND CONTOURED SEALING SURFACE

BACKGROUND OF THE INVENTION

This invention relates to sealing an open end parison at orientation temperature.

The blow molding art goes back over 100 years. Traditionally, blow molded articles have been formed by the downward extrusion of a molten parison from an annular die into position between opposing mold halves. The mold halves are then closed and fluid pressure introduced into the parison to expand same into conformity with the mold. Recently, techniques have been developed whereby high strength articles having exceptional sparkle and clarity can be produced by blow molding a parison preform which has been cooled to room temperature and thereafter reheated to orientation temperature so as to achieve molecular orientation in the resulting article during the fabrication steps. It is apparent that the most economical manner to produce individual parison preforms is to extrude a continuous length of tubular material and thereafter sever it into individual work pieces, as opposed to injection molding a closed end parison preform, for instance. However, this preferred method of forming individual parison preforms carries with it the inherent disadvantage of providing a preform which is open at each end and which, therefore, must be closed at one end preparatory to blow molding. Thus, in order to operate economically with individual parison preforms, the artisan is faced with the problem of achieving a seal in a parison which is at orientation temperature and thus far below the temperature at which the parison would be tacky and easily sealable. Such preforms can be sealed with fair reliability by the application of extremely high pressure from a plurality of directions radially inward toward a point while simultaneously pressing downward on the thus closed end, but this involves the use of complex equipment and increases the cycle time.

SUMMARY OF THE INVENTION

It is an object of this invention to seal an open end parison preform at orientation temperature;

It is a further object of this invention to provide an improved seal on parison preforms; and It is yet a further object of this invention to make possible the economic production of high strength, clear bottles.

In accordance with this invention, a parison preform is stretched longitudinally and preblown slightly, after which the walls are sealed together and severed with a contoured sealing and severing means.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
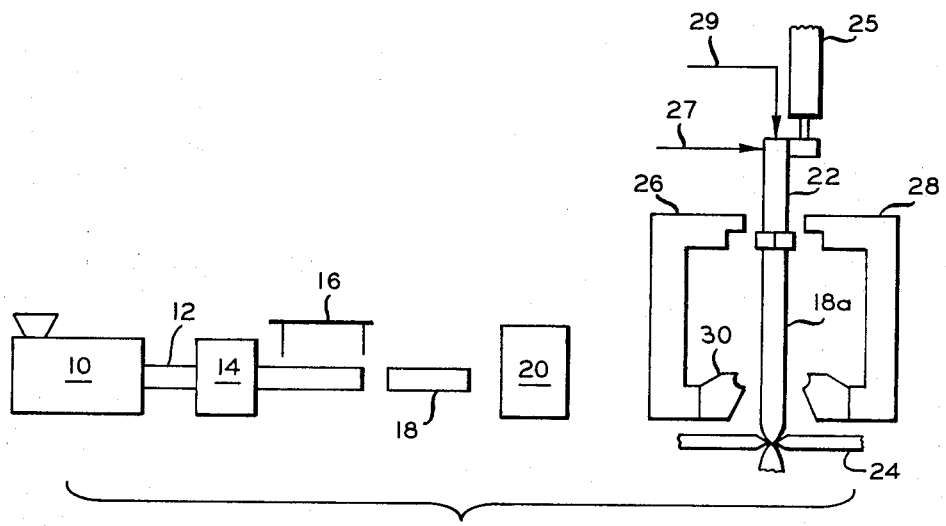
FIG. 1 is a schematic representation of apparatus for forming and sealing parison preforms in accordance with the instant invention.

The instant invention is applicable for the sealing of any hollow, elongated article having triangular, square, or round shape or the like, although its primary utility will be found in the sealing of cylindrical parison preforms.

The parison preforms which are sealed in accordance with the instant invention can be made of any orientable crystalline material such as polymers of at least one mono-1-olefin having two–eight carbon atoms per molecule, preferably polymers and copolymers of ethylene, propylene, and butene, more preferably polypropylene.

The open end parison preforms to be sealed in accordance with this invention can be formed by any means known in the art, although the preferred means is to simply extrude a tube or pipe in a manner conventional in the art and thereafter sever this continuous extrudate into work pieces of the desired length.

The open end parison preforms are heated to orientation temperature preparatory to sealing and blow molding. By orientation temperature, it is meant that temperature at which crystalline polymers on stretching exhibit an increase in strength. For polymers of mono-1-olefins having two–eight carbon atoms per molecule, this temperature is generally in the range of 1°–50 F., preferably 10°–30° F., below the crystalline melting point. The crystalline melt point can be determined by placing a small sample of the material to be tested on a heating stage of a polarizing microscope and recording the crystalline melting point as that temperature at which the last birefringence disappears on slow heating. The individual open end parison preforms can be reheated to this orientation temperature in an air oven, in a liquid bath, in a heating block, or by subjecting them to radiant heat, or any other suitable means.

The term "crystalline" is utilized throughout this specification in the sense conventional in the industry to describe a material which is substantially crystalline, that is, a material having about 50 percent or more crystallinity under normal conditions.

It is essential to this invention that the parison preform, while at orientation temperature, be stretched longitudinally and preblow fluid introduced into the interior of the parison preform to expand it slightly, after which the mold halves close on the stretched portion of the parison with a contoured sealing and severing means pinching the walls together to seal and sever. The longitudinal stretch ratio should be in the range of 1.1:1 to 8:1, preferably 1.5:1 to 2.5:1. By longitudinal stretch ratio is meant the ratio of the length of the portion being stretched (i.e., the portion of the parison between the gripping means) after stretching to its length before stretching. A ratio of 1:1 would indicate no affirmative stretching prior to introduction of the blow fluid.

It is essential to the operation of this invention that the stretched parison be preblown slightly prior to closing of the mold on it to effect sealing. This obviously necessitates some means for temporarily closing off one end of the parison prior to the time the mold closes and forms the final seal. It is preferred that this be done simply by grasping one end of the parison with a thread-forming means and the other end between two pinching means which serve to close the parison off. The thread-forming means and this pinching means can then be moved axially apart to effect the longitudinal stretching and fluid pressure can be introduced through a hollow mandrel in the thread-forming means with escape of the preblow fluid precluded by the fact that the walls are closed together at the lower end thereof by the pinching fingers. Alternatively, a plug can be temporarily placed in the open lower end of the parison or the lower end could be connected to the same source of preblow fluid as the upper end so as to have fluid back pressure on the interior of the parison.

Surprisingly, it has been found that when operating in accordance with this invention, that is, wherein the parison is stretched and preblown before being closed off with a contoured sealing and severing means, a superior seal results as compared with a seal formed in an identical manner except without the preblow. This result was totally unexpected and even in light of the observed data, is not explainable. Indeed, it is surprising that a parison at orientation temperature could be preblown at all, much less that preblowing would effect an improvement in the seal. While applicant does not wish to be bound by any theory, it appears that when the parison is not preblown, the closing of the mold walls causes the parison to come together and be partially sealed along a surface extending upwardly one-sixteenth of an inch or so above the point at which pressure is being applied. Then, on introduction of the main blow fluid, this partially sealed area is torn apart as the parison is blown out into conformity with the mold walls. When utilizing the preblow in accordance with the invention prior to closing the mold halves, the parison is prevented by the internal fluid pressure from coming together except over the area where pressure is actually being applied, and this, somehow, results in a greatly improved seal. Also, unsightly tear marks are prevented from forming.

The preblow fluid must be introduced under a greater pressure than the 3–6 psi normally used for preblow in conventional blow molding operations in which hot extruded parisons are used. Preblow pressure of at least 25 psig is preferred with a range of 25–50 psig being entirely satisfactory. However, it has been found that by controlling the rate of introduction or the timing of the preblow introduction, the same source of fluid can be used in the preblow which is utilized in the main blow. For example, fluid under the full pressure (80–150 psig, for instance) can be admitted to preblow the parison just as the mold halves begin to close; without ever interrupting the flow, the parison will be preblown just as the molds close and thereafter the fluid pressure expands the parison into conformity with the mold. The main blow fluid is preferably air at a pressure of 60–200, preferably 90–150, psig.

It has been stated hereinabove that it is essential that the parison be stretched in the area which is to be sealed prior to sealing and that it is essential that the parison be preblown prior to the sealing. The third essential feature of this invention is the shape of the sealing and severing means, or alternatively, the manner and direction of the forces employed in effecting the sealing and severing. The contoured sealing and severing area has a severing edge which is the furthermost extension thereof; this severing edge cooperates with a matching edge on the opposing mold half to sever the parison. Preferably, these edges are disposed so as to project past a theoretical center line between the two mold parts for a distance of 0.5 to 5, preferably 1 to 4, mils. Adjacent a bottom wall-forming portion of the sealing and severing section of the mold halves is a second projection which cooperates with a matching projection on the opposing mold half to hold said thus severed parison within a bead-forming cavity, to be described hereinbelow. For use with parisons having a wall thickness of 0.075 to 0.225 inches, a leading edge of these holding projections preferably has a land height of 5 to 16, preferably 8 to 12, mils. Between the holding projection and the severing edge of each sealing and severing means is a small cavity which, in cooperation with a matching cavity on the other mold half, forms a bead-forming mold. Preferably, this cavity has a circular configuration although other configurations can also be used. This cavity preferably has a maximum lateral dimension of 15–25 percent of the combined thickness of the two walls of the parison prior to stretching. For parisons having a wall thickness before stretching of 150 mils, a maximum lateral dimension of this cavity of 45–75 mils is satisfactory.

While it is not essential to the invention, it is highly preferred that the sealing and severing means have surfaces sloping back from the severing edge on the side opposite said bead-forming cavity at an angle such that the included angle of the opposed surfaces when the mold parts are in a closed position is within the range of 15–100, preferably 25–90, more preferably 30°–47°. In this way, the lateral pressure on the tail portion of the parison which is being severed has a vertical component of force which is sufficient to cause the severed tail portion to fall free from the portion of the parison held within the bead-forming cavity.

That portion of the mold which constitutes the sealing and severing means can be made of any suitable metal. A preferred material is Vega steel, hardened to a 59–61 Rockwell C hardness. It has been found that blades made of this material having the projection past the center line as set out in the preferred embodiments of this invention are not dulled, even after a million cycles or more.

The effect of the combination of the stretching, the preblow, and the sealing with the contoured sealing and severing means as disclosed hereinabove results in sufficient working of the polymer in the seal area that a true fusion seal results. The purpose of the bead, therefore, is not to provide mechanical reinforcement but is part of the procedure which has been found to best provide a true fusion seal of polymer which is at a temperature at which it normally would not seal. It is well known in the art to provide mechanical reinforcing ribs at the seal area of blow molded articles made from thoroughly molten thermoplastic material.

Referring now to the FIGURES, particularly FIG. 1, there is shown a conventional screw extruder 10 for forming a tubular extrudate 12. Molten tubular extrudate 12 passes immediately into vacuum cooling and sizing chamber 14. The solidified tubular extrudate then passes from sizing chamber 14 to cutting means 16 where it is severed into individual open end parison preforms 18. Parison preforms 18 pass through air oven 20 where they are heated to orientation temperature. They are then transferred by means not shown to thread-forming head 22. Thread-forming head 22 can, for instance, be identical to that shown in Turner et al, U.S. Pat. No. 3,390,426, the disclosure of which is hereby incorporated by reference. Parison 18 is grasped at the other end thereof by gripping fingers 24, which are brought together by means of air cylinders or cams not shown, and relative movement effected between thread-forming head 22 and gripping fingers 24 by means of raising head 22 through the action of cylinder 25 to stretch the parison to the elongated condition depicted by reference character 18a. Preblow air is introduced through line 27. Mold halves 26 and 28 then close on the thus stretched parison. Sealing and severing inserts 30 in mold halves 26 and 28 perform the mechanical operation of bringing the parison walls into intimate contact and severing the parison. Gripping fingers 24 then retract to allow the severed tail portion to fall free from the remainder of the parison. The main blow air is then introduced through line 29.

Figure 2:
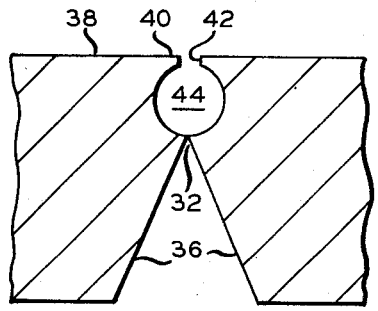
FIG. 2 is an enlarged fragmentary cross section of the contoured sealing and severing means of FIG. 1.
Figure 3:
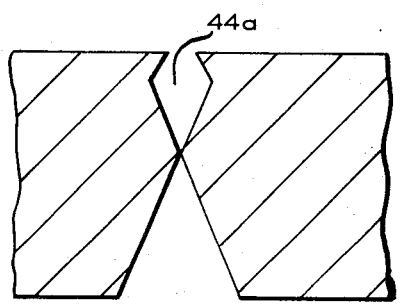
FIG. 3 is an enlarged fragmentary cross-sectional view of an alternate embodiment of the contoured sealing and severing means.
Figure 4:
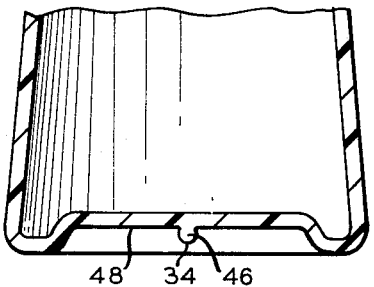
FIG. 4 is a cross-sectional view of the lower section of a bottle made from a parison preform sealed and severed in accordance with this invention.
Figure 5:
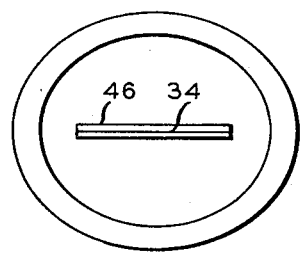
FIG. 5 is a bottom view of the bottle of FIG. 4.

FIG. 2 shows sealing and severing inserts 30 in greater detail. Each insert has severing edge 32 which severs the parison along a line 34 (See FIGS. 4 and 5). Each of said severing edges 32 projects past the theoretical center line separating the two mold inserts 30 when the mold is closed, a distance of 0.5 to 5 mils. Surfaces 36,36 slope downwardly from severing edges 32 to form an included angle as shown in the drawing of about 47°, although this can vary as noted hereinabove, and it is not essential to the invention. However, in combination with the projection of severing edges 32 past the theoretical center line, this results in a complete severing of the parison 100 percent of the time, thus eliminating the need for trimming operations to remove the tail portion. Adjacent surface 38 which forms the bottom wall of the article being molded, there is parison holding projection 40. Preferably, parison holding projection 40 has a flat land area as depicted by reference character 42 in this FIGURE. Each insert 30 has a small bead-forming cavity 44 which cooperates with a similar cavity in the opposing insert to form bead or depending tab 46 (See FIG. 4). Cooperation of the two bead-forming cavities preferably form a circular shape as shown in FIG. 2, although other shapes such as the triangular shape formed by cavity 44a of FIG. 3 can be utilized. Bead 46 generally depends downwardly from lower surface 48 of the bottom wall section of the molded article a distance of one one-hundredth to one-half, preferably one thirty-second to one-eighth inch.

In the above drawings, many conventional parts such as heaters, temperature controllers, frames, cooling channels, and the like have been omitted for the purpose of simplicity, but their inclusion is understood by those skilled in the art and is within the scope of the invention.

EXAMPLE I

Polypropylene homopolymer having a density of 0.905 (ASTM D 1505–63T), a melt flow of 2 (ASTM D 1238–62T, Condition L), and a crystalline melting point of about 340° F. was extruded into tubing having an outside diameter of 0.8-inch and a wall thickness of 0.150-inch. The tubing was cooled to room temperature in a vacuum sizing and quenching chamber and cut into 7-inch lengths. These 7-inch lengths were heated to a temperature of 320° F. The thus heated blanks were then placed in thread-forming jaws such as are shown in FIG. 1 while being held at the other end thereof by gripping fingers similar to those shown in FIG. 1. Relative axial movement was effected between said thread-forming means and said gripping fingers to achieve a longitudinal stretch ratio of 1:2. Thereafter, preblow air at a pressure of 50 psig was introduced into the interior of the parison to give slight radial expansion to the parison. Thereafter, the mold parts similar to those shown in FIG. 1 having a configuration in the sealing and severing area identical to that shown in FIG. 2 were closed upon the parisons. These operations were carried out in immediate succession so that the parisons remained at orientation temperature. Main blow fluid at a pressure of 150 psig was then introduced into the interior of the parison to cause it to conform to the shape of the mold to give a biaxially oriented bottle having clear, highly-strengthened walls. Similar bottles were made without utilizing the preblow but with all other conditions including the type of polymer and the type of mold configuration being identical. The resulting bottles were then filled with water and dropped from a height of 12 feet. The results were as follows:

PER CENT FAILURES

| Invention With Preblow | Control Without Preblow |
| --- | --- |
| 0 | 90* |

*Approximately 40 per cent of those made without preblow leaked prior to the drop, whereas none of the samples made in accordance with the invention leaked.

It was further observed that the pinching fingers which grip the bottom portion of the parison exert a force against the walls of the parison, thus flattening the walls out and pressing them together under great pressure. No fusion seal resulted in this area, thus indicating that simple pressure forcing the walls of the parison together is not sufficient to effect a seal. Thus, the techniques of the instant invention are shown to be superior to reliance on mere mechanical force to press the parison walls together to effect a seal. The bottles formed in accordance with this invention in both Examples I and II exhibited a true fusion seal when the parison was closed off.

EXAMPLE II

Identical parisons were blown into bottles in an identical manner as set out in Example I except that the preblow fluid was under pressure of 150 psig and the introduction was timed so that the parison was just preblown as the mold halves closed. This fluid introduction was continued without interruption to serve as the main blow fluid. Perfect bottles were consistently formed.

While this invention has been described in detail for the purpose of illustration, it is not to be construed as limited thereby, but is intended to cover all changes and modifications within the spirit and scope thereof.

I claim:

1. A method for closing an open end crystalline thermoplastic parison wherein said thermoplastic is a polymer of at least one mono-1-olefin having two–eight carbon atoms per molecule and said polymer is heated to an orientation temperature of 1°–50° F. below the crystalline melting point thereof comprising: stretching said parison longitudinally; introducing preblow fluid into said parison so as to have pressure on the interior of said parison; thereafter applying pressure along a narrow line to opposing side walls of said parison to sever said parison while simultaneously applying lateral pressure to said parison above said severing line to mold said parison above said line into a bead along the thus formed sealing seam; and maintaining pressure on said bead to hold said walls of said parison together as main blow fluid is introduced into the interior of said parison to cause same to conform to the shape of a molding zone, thus forming a biaxially oriented hollow article having said bead depending from a bottom wall thereof.

2. The method according to claim 1 wherein said polymer is polypropylene.

3. The method according to claim 2 wherein said temperature is 10-30°F below the crystalline melting point of said polymer.

4. The method according to claim 1 wherein said bead is circular.

5. The method according to claim 1 wherein pressure is applied against a tail portion below said severing line in a manner such that there is a longitudinal component of force sufficient to cause said tail portion to fall free.

6. A method according to claim 1 wherein said preblow fluid causes a slight radial expansion of the parison.

* * * * *